United States Patent [19]

Kuroda et al.

[11] 4,209,601

[45] Jun. 24, 1980

[54] PROCESS FOR THE PRODUCTION OF POLYOLEFINS

[75] Inventors: Nobuyuki Kuroda, Yokohama; Takeichi Shiraishi, Kawasaki; Akio Itoh, Yokosuka; Kazuo Matsuura, Kawasaki; Mituji Miyoshi, Kanagawa, all of Japan

[73] Assignee: Nippon Oil Company, Limited, Tokyo, Japan

[21] Appl. No.: 887,008

[22] Filed: Mar. 16, 1978

Related U.S. Application Data

[63] Continuation-in-part of Ser. No. 646,898, Jan. 6, 1976, abandoned.

[30] Foreign Application Priority Data

Jan. 10, 1975 [JP] Japan .................................. 50/5015
Jan. 24, 1975 [JP] Japan .................................. 50/9699

[51] Int. Cl.$^2$ ............................ C08F 4/02; C08F 10/02
[52] U.S. Cl. ................................. 526/114; 252/429 B; 252/429 C; 526/125; 526/132; 526/348; 526/352; 526/906
[58] Field of Search ................................ 526/114, 125

[56] References Cited

U.S. PATENT DOCUMENTS

| | | | |
|---|---|---|---|
| 3,502,634 | 3/1970 | Stedefeder et al. | 526/139 |
| 3,991,260 | 11/1976 | Matsuura et al. | 526/125 |

FOREIGN PATENT DOCUMENTS

| | | | |
|---|---|---|---|
| 2342200 | 3/1974 | Fed. Rep. of Germany | |
| 2365235 | 7/1974 | Fed. Rep. of Germany | 526/125 |
| 1275641 | 5/1972 | United Kingdom | 526/124 |
| 1314258 | 4/1973 | United Kingdom | 526/125 |
| 1335887 | 10/1973 | United Kingdom | 526/125 |

*Primary Examiner*—Edward J. Smith
*Attorney, Agent, or Firm*—Scully, Scott, Murphy & Presser

[57] ABSTRACT

The present invention discloses improved catalysts for polymerizing or copolymerizing olefins and a process for the production of polyolefins comprising a polymerization or copolymerization of olefins by the use of said catalysts. According to the invention there is provided a process for the production of polyolefins by polymerizing or copolymerizing olefins using as the catalyst a solid component containing a titanium compound and/or a vanadium compound and an organometallic compound, said solid component comprising a substance obtained by co-pulverizing (1) a metal halide selected from the group consisting of magnesium halides and manganese halides, (2) a compound represented by the general formula $B(OR)_n X_{3-n} X_3$ in which n is a number of the range $0 < n \leq 3$, X represents a halogen atom and R is a hydrocarbon radical containing from 1 to 20 carbon atoms and may be alike or different and (3) a titanium compound and/or a vanadium compound.

3 Claims, No Drawings

PROCESS FOR THE PRODUCTION OF POLYOLEFINS

CROSS REFERENCE TO RELATED APPLICATION

This application is a continuation-in-part application of our prior filed application Ser. No. 646,898 filed Jan. 6, 1976, now abandoned.

BACKGROUND OF THE INVENTION

1. Field of the Invention

This invention relates to novel catalysts for olefin polymerization. More particularly, it is concerned with a process for the production of polyolefins which comprises polymerizing or copolymerizing olefins with a catalyst obtained by activating with organometallic compounds solid powders obtained by co-pulverizing (1) a metal halide selected from the group consisting of magnesium halides and manganese halides, (2) a compound represented by the general formula $B(OR)_nX_{3-n}$ where n is a number of the range $0 < n \leq 3$, X represents a halogen atom and R is a hydrocarbon radical containing from 1 to 20 carbon atoms and may be alike or different and (3) a titanium compound and/or vanadium compound, thereby remarkably increasing the yield of the polymer per the solid as well as that per the transition metal with a result that the step for removing the catalyst becomes unnecessary due to decrease in the catalyst residue in the polymer, and moreover remarkably increasing impact strength of the resulting polymer.

Moreover, a polyolefin prepared by polymerizing an olefin using the catalyst of this invention has not only a very high bulk specific gravity but also a large average particle size and therefore this invention provides the following important advantages:

(1) scattering of polymer particles into vapour phase space in the reactor due to stirring and the like is so decreased that adhering of polymer particles to the reactor wall and the like is very decreased and therefore a stable operation can be done, (2) adhering of polymer particles to the inner walls of pipes is so small that the slurry transportation can be more easily done, (3) in the solvent removal step, due to large sizes of polymer particles, scattering of polymer particles with steam is not caused and therefore the solvent removal step can be easily effected, and (4) also in the drying step and the pelleting step, scattering of polymer particles is not caused and these steps can be easily effected like the solvent removal step.

As described above, the use of the catalyst of this invention facilitates handling of the polymer slurry and enables higher productivity per unit reaction volume.

2. Description of the Prior Art

In the art prior to the invention, an improvement in catalytic activity for the polymerization of olefins has been made by the use of catalysts prepared by a combination of a transition metal compound in advance carried on a magnesium compound such as MgO or $MgCl_2$ or a manganese compound such as $MnCl_2$ or $MnI_2$ with an organoaluminum compound. Simultaneous improvement in impact strength of the resulting polyolefin, however, has not satisfactorily achieved by any of the known catalysts. Need has recently been arisen in the resin for injection molding for higher impact, particularly Izot impact strength; especially so in the transportation art as represented by the crate for beer. Therefore, there has been a high demand for development of catalysts with a high activity as well as affording a higher impact strength in the resulting polyolefins.

We have previously proposed the use of catalysts comprising a combination of solid powders from co-pulverization of a titanium compound such as titanium tetrachloride or a titanium alkoxide and a carrier prepared by co-pulverizing a magnesium halide and a compound of the general formula $Al(OR)_3$ wherein R is alkyl containing 1-4 carbon atoms and three R may be alike or different or one prepared by co-pulverizing a magnesium halide and a compound of the general formula $Si(OR)_mX_{4-m}$ wherein R is a hydrocarbon radical containing 1-20 carbon atoms, X represents a halogen atom and m is in the range $0 < m \leq 4$ with an organometallic compound, with which polyolefins with a high impact strength can be produced.

SUMMARY OF THE INVENTION

According to the invention, surprisingly, the catalysts are very high in polymerizing activity, the residual catalyst in the polyolefin resulting from the process for the production of polyolefins using said catalysts is extremely low with no step for removing the catalyst applied, such defects in the prior art molded products as formation of fish eye, and breakage and opacity are very much improved, and impact strength of the resulting polyolefin is very much higher. It is a further advantage that bulk specific gravity of the resulting polyolefin is so high and average particle size of the resulting polyolefin is so large as favorably affecting handling of the polymer slurry and productivity of the polyolefin. It is also advantageous in view of the production catalyst that there is no need for washing and removing step in the production of catalyst by the co-pulverization of necessary reagents in such a means as a ball mill; there is no problem of discarding a solution containing the transition metal which is a large issue of the day.

DESCRIPTION OF THE INVENTION

In preparing the catalyst according to the present invention, (1) a magnesium halide or a manganese halide, (2) a compound of the aforementioned general formula $B(OR)_nX_{3-n}$ and (3) a titanium compound and/or a vanadium compound are co-pulverized in an inert gas atomosphere; the co-pulverization may be carried out either in the presence of the above-cited three or with any two of them and subsequently with additional one.

Means used for the co-pulverization are not particularly limited but, usually, such means as ball mill, vibration mill, rod mill and impact mill are employed. Conditions such as order of the mixing, pulverization time and pulverization temperature can easily be determined by those skilled in the art in accordance with the manner in which the pulverization is made. In general, pulverization temperature in the range between 0° C. and 200° C., preferably between 20° C. and 100° C. and pulverization time in the range from 0.5 to 50 hours, preferably from 1 to 30 hours are employed.

The magnesium halide used in the invention should be substantially anhydrous and includes magnesium fluoride, magnesium chloride, magnesium bromide and magnesium iodide; magnesium chloride is particularly preferred.

The manganese halide used in the invention should be substantially anhydrous and includes manganese fluoride, manganese chloride, manganese bromide and manganese iodide; manganese chloride is particularly preferred.

As the compound of the general formula $B(OR)_nX_{3-n}$ wherein n and R are as defined above which is employed in this invention are mentioned various compounds such as, for example, $B(OCH_3)_3$, $B(OC_2H_5)_3$, $B(On-C_3H_7)_3$, $B(Oi-C_3H_7)_3$, $B(On-C_4H_9)_3$, $B(Ot-C_4H_9)_3$, $B(OC_6H_5)_3$, $B(OCH_3)_2Cl$, $B(OC_2H_5)_2Cl$, $B(Oi-C_3H_7)_2Cl$ and $B(Ot-C_4H_9)_2Cl$.

Proportions of the magnesium halide or manganese halide and the compound represented by the general formula $B(OR)_nX_{3-n}$ mixed are not particularly limited and the ratio magnesium halide/$B(OR)_nX_{3-n}$ or manganese halide/$B(OR)_nX_{3-n}$ is preferably from 1/1 to 1/0.001, and more preferably from 1/0.5 to 1/0.01.

The amount of titanium compound and/or vanadium compound to be carried on is most preferably arranged in such a manner that the content of transition metal(s), namely titanium and/or vanadium in the solid formed is in the range from 0.5 to 20% by weight; in order to produce well-balanced activities per transition metal and per solid the range from 1 to 10% by weight is particularly preferred.

It is of course necessary in consideration of the ease of catalyst handling, too, to fix proportions of the three to be mixed under such conditions as finally yielding solid powders.

As the titanium compound and/or the vanadium compound used in the invention are employed known compounds used in the Ziegler-Type catalyst; particularly preferred are tetravalent titanium compounds such as titanium tetrachloride, titanium tetrabromide, monoethoxytitanium trichloride, diethoxytitanium dichloride, tetraethoxytitanium, dibutoxytitanium dichloride, tetrabutoxytitanium and phenoxytitanium trichloride, trivalent titanium compounds prepared by various methods such as titanium trichloride and titanium trichloride-aluminum chloride eutectic, tetravalent vanadium compounds such as vanadium tetrachloride, pentavalent vanadium compounds such as vanadium oxychloride and orthoalkyl vanadates and trivalent vanadium compounds such as vanadium trichloride. It is also feasible to use as the transition metal compound used in the invention reaction products of the above-mentioned titanium compound and/or vanadium compound with another compound; illustrative are reaction products of $Ti(OR)_x Cl_{4-x}$ wherein R is a hydrocarbon radical containing 1–20 carbon atoms and $0 < x \leq 4$ with $SiCl_4$.

Combinations of a vanadium compound such as vanadium tetrachloride, vanadium trichloride or vanadium triethoxide and a titanium compounds also are often employed for making the present invention more effective. Molar ratio of V/Ti in this case is preferably in the range from 2/1 to 0.01/1.

The polymerization reaction of olefins using the catalyst of the invention is carried out in the same way as in the polymerization reaction of olefins using a conventional Ziegler-Type catalyst. That is to say, conditions substantially free from oxygen and water are employed throughout the reaction. Such conditions are employed for the olefin polymerization as a temperature from 20° to 300° C., preferably from 50° to 180° C. and a pressure from ordinary pressure to 70 kg/cm$^2$, preferably from 2 to 60 kg/cm$^2$. Although the molecular weight may be controlled to some extent by changing the polymerization conditions such as polymerization temperature and molar ratio of the catalyst, it is more effectively done by the addition of hydrogen. Of course, two or more multistage polymerization reactions being different in polymerization conditions such as hydrogen concentration and polymerization temperature may be conducted with the catalysts of the invention without any trouble at all.

The process according to the invention may be applied to polymerization of anyone of the olefins polymerizable with a Ziegler-Type catalyst. It is advantageously applied to homopolymerization of α-olefins such as ethylene and propylene as well as to copolymerization of ethylene-propylene, ethylene-1-butene, propylene-1-butene, ethylene-1,4-hexadiene, ethylene-ethylidenenorbornene and the like.

As the organometallic compound employed in the present invention may be used the organic compounds of metals of the Group I–IV of the Periodic Table known as a component of the Ziegler catalyst. Organoaluminum and organozinc compounds are particularly preferably. The embodiments are such organoaluminum compounds as those of the general formulae $R_3Al$, $R_2AlX$, $RAlX_2$, $R_2AlOR$, $RAl(OR)_2$, $RAl(OR)X$ and $R_3Al_2X_3$ wherein R is alkyl or aryl and may respectively alike or different and X is a halogen atom and organozinc compounds of the general formula $R_2Zn$ wherein R represent alkyl and may be alike or different; triethylaluminum, trisobutylaluminum, trihexylaluminum, trioctylaluminum, tridecylaluminum, diethylaluminum chloride, ethylaluminum sesquichloride, ethoxydiethylaluminum, diethylzinc and mixtures thereof are mentioned. The amount of these organometallic compounds employed in this invention is not particularly limited and usually may be in the range from 0.1 to 1000 mol. per mole of the transition metal halide.

g DESCRIPTION OF PREFERRED EMBODIMENTS

The examples which follow are submitted to illustrate and not to limit this invention.

EXAMPLE 1 a. Preparation of the catalyst.

In a stainless steel pot with an inner volume of 400 ml. containing 25 stainless steel balls ½ in. in diameter were placed 6.7 g. of magnesium chloride, 1.5 g. of boron triethoxide and 1.5 g. of titanium tetrachloride and a ball milling was carried out unter nitrogen at room temperature for 16 hours. One gram of solid powders resulting from the ball milling contained 41 mg. of titanium.

b. Polymerization

A 2-l. stainless steel autoclave equipped with an induction stirrer was purged with nitrogen, in which was then placed 1,000 ml. of hexane. To it were then added 1 mmol. of triethylaluminum and 30 mg. of the above-described solid powders, followed by heating with stirring to 90° C. The system was 2 kg/cm$^2$G due to vapor pressure of the hexane and hydrogen was introduced thereinto to a total pressure of 5.6 kg/cm$^2$G. Then, ethylene was introduced to a total pressure of 10 kg/cm$^2$G to initiate the polymerization. The polymerization was made for 1 hour while continuously introducing ethylene to maintain the total pressure at 10 kg/cm$^2$G. After completion of the polymerization, the polymer slurry was transferred to a beaker and the hexane was removed under reduced pressure there was obtained 270 g. of white polyethylene with a melt index of 5.4, a bulk specific gravity of 0.23 and an average particle size of 410μ. Activity of the catalyst was 50,000 g. polyethylene/g. Ti.hr..C$_2$H$_4$ pressure and 2,050 g. polyethylene/g. solid.hr..C$_2$H$_4$ pressure; polyethylene with a high bulk specific gravity and a large average particle size was obtained in a high activity. Izod impact strength of the above-mentioned polyethylene as measured according to ASTM-D256-56 was 0.89 ft.lb./in., being far higher than with Comparative Examples 1 and 2.

COMPARATIVE EXAMPLE 1

In a stainless steel pot with an inner volume of 400 ml. containing 25 stainless steel balls ½ in. in diameter were placed 10 g. of magnesium chloride and 1.80 g. of titanium tetrachloride and a ball milling was carried out at room temperature for 16 hours. One gram of solid powders resulting from the ball milling contained 39 mg. of titanium.

A polymerization was made for 1 hour using 30 mg. of the aforementioned solid by the same procedures as in Example 1; there was obtained 145 g. of polyethylene with a melt index of 5.5, a bulk specific gravity of 0.14 and an average particle size of 250μ. Activity of the catalyst was 28,200 g. polyethylene/g. Ti.hr..C$_2$H$_4$ pressure and 1,100 g. polyethylene/g. solid.hr..C$_2$H$_4$ pressure. Izod impact strength was 0.60 ft.lb./in.

COMPARATIVE EXAMPLE 2

In a stainless steel pot with an inner volume of 400 ml. containing 25 stainless steel balls ½ in. in diameter were placed 10 g. of boron triethoxide and 1.80 g. of titanium tetrachloride and a ball milling was carried out at room temperature for 16 hours. One gram of solid powders resulting from the ball milling contained 42 mg. of titanium.

A polymerization was made for 1 hour using 30 mg. of the aforementioned solid by the same procedures as in Example 1; there was obtained 6 g. of polyethylene. Activity of the catalyst was 1,080 g. polyethylene/g. Ti.hr..C$_2$H$_4$ pressure and 45 g. polyethylene/g. solid.hr..C$_2$H$_4$ pressure.

EXAMPLE 2

In the ball mill pot as set forth in Example 1 were placed 10 g. of anhydrous magnesium chloride, 2.5 g. of boron diethoxychloride and 2.4 g. of titanium tetrachloride. A ball milling was carried out under nitrogen at room temperature for 16 hours. One gram of the solid resulting from the ball milling contained 38 mg. of titanium.

A polymerization was made for 1 hour using 30 mg. of the aforementioned solid by the same procedures as in Example 1; there was obtained 261 g. of white polyethylene with a melt index of 5.7, a bulk specific gravity of 0.29 and an average particle size of 450μ. Activity of the catalyst was 52,030 g. polyethylene/g. Ti.hr..C$_2$H$_4$ pressure and 1,980 g. polyethylene/g. solid.hr..pressure. Izod impact strength of the resulting polyethylene was 0.91 ft.lb./in. A polyethylene with a higher bulk specific gravity, a larger average particle size and a higher Izod impact strength as compared with Comparative Example 1 was obtained in a very high activity.

EXAMPLE 3

In the ball mill pot as set forth in Example 1 were placed 10 g. of anhydrous magnesium chloride, 2.7 g. of boron triisopropoxide and 2.5 g. of titanium tetrachloride. A ball milling was carried out under nitrogen at room temperature for 16 hours. One gram of the solid resulting from the ball milling contained 41 mg. of titanium.

A polymerization was made for 1 hour using 30 mg. of the aforementioned solid by the same procedures as in Example 1; there was obtained 238 g. of white polyethylene with a melt index of 5.2, a bulk specific gravity of 0.33 and an average particle size of 430μ. Activity of the catalyst was 43,980 g. polyethylene/g. Ti.hr..C$_2$H$_4$ pressure and 1,800 g. polyethylene/g. solid.hr..pressure. Izod impact strength of the resulting polyethylene was 1.02 ft.lb./in. A polyethylene with a higher bulk specific gravity, a larger average particle size and a higher Izod impact strength as compared with Comparative Example 1 was obtained in a very high activity.

EXAMPLE 4

In the ball mill pot as set forth in Example 1 were placed 10 g. of anhydrous magnesium chloride, 2.5 g. of boron triethoxide and 3.4 g. of TiCl$_3$.⅓AlCl$_3$. A ball milling was carried out under nitrogen at room temperature for 16 hours. One gram of the solid resulting from the ball milling contained 50 mg. of titanium.

A polymerization was made for 1 hour using 30 mg. of the aforementioned solid by the same procedures as in Example 1; there was obtained 259 g. of white polyethylene with a melt index of 5.0, a bulk specific gravity of 0.31 and an average particle size of 510μ. Activity of the catalyst was 39,200 g. polyethylene/g. Ti.hr..C$_2$H$_4$ pressure and 1,960 g. polyethylene/g. solid.hr..pressure. Izod impact strength of the resulting polyethylene was 1.05 ft.lb./in. A polyethylene with a higher bulk specific gravity and a higher Izod impact strength as compared with Comparative Example 1 was obtained in a very high activity.

COMPARATIVE EXAMPLE 3

In a stainless steel pot with an inner volume of 400 ml. containing 25 stainless steel balls ½ in. in diameter were placed 10 g. of magnesium chloride and 2.6 g. of TiCl$_3$..⅓AlCl$_3$ and a ball milling was carried out at room temperature for 16 hours. One gram of solid powders resulting from the ball milling contained 52 mg. of titanium.

A polymerization was made for 1 hour using 30 mg. of the aforementioned solid by the same procedures as in Example 1; there was obtained 129 g. of polyethylene with a melt index of 4.9, a bulk specific gravity of 0.13 and an average particle size of 220μ. Activity of the catalyst was 18,790 g. polyethylene/g. Ti.hr.. C$_2$H$_4$ pressure and 980 g. polyethylene/g. solid. hr.. C$_2$H$_4$ pressure.

COMPARATIVE EXAMPLE 4

In the ball mill pot as set forth in Example 1 were placed 10 g. of anhydrous magnesium chloride, 4.4 g. of aluminum triethoxide and 2.7 g. of titanium tetrachloride. A ball milling was carried out under nitrogen at room temperature for 16 hours. One gram of the solid resulting from the ball milling contained 42 mg. of titanium.

A polymerization was made for 1 hour using 30 mg. of the aforementioned solid by the same procedures as in Example 1; there was obtained 218 g. of white polyethylene. An average particle size of the resulting polyethylene was 240μ.

EXAMPLE 5

In the ball mill pot as set forth in Example 1 were placed 6.7 g. of manganese chloride, 1.5 g. of boron triethoxide and 1.5 g. of titanium tetrachloride. A ball milling was carried out under nitrogen at room temperature for 16 hours. One gram of solid powders resulting from the ball milling contained 40 mg. of titanium.

A polymerization of ethylene was made for 1 hour using 30 mg. of the aforementioned solid by the same procedures as in Example 1; there was obtained 65 g. of white polyethylene with a melt index of 5.2, a bulk specific gravity of 0.25 and an average particle size of 420μ. Activity of the catalyst was 12,300 g. polyethylene/g. Ti.hr..$C_2H_4$ pressure and 490 g. polyethylene/g. solid. hr..$C_2H_4$ pressure. Izod impact strength of the resulting polyethylene was 0.95 ft. lb./in.

COMPARATIVE EXAMPLE 5

In the ball mill pot as set forth in Example 1 were placed 10 g. of anhyrous manganese chloride and 1.9 g. of titanium tetrachloride. A ball milling was carried out under nitrogen at room temperature for 16 hours. One gram of solid powders resulting from the ball milling contained 39 mg. of titanium.

A polymerization was made for 1 hour using 30 mg. of the aforementioned solid by the same procedures as in Example 1; there was obtained 61 g. of polyethylene with a melt index of 5.5, a bulk specific gravity of 0.13 and an average particle size of 230μ. Activity of the catalyst, which was 11,800 g. polyethylene/g. Ti.hr..$C_2H_4$ pressure and 460 g. polyethylene/g. solid.hr.. $C_2H_4$ pressure, was relatively high. Impact strength of the resulting polyethylene, which was 0.57 ft. lb./in., was far lower than with Example 5.

EXAMPLE 6

Using 30 mg. of the solid obtained in Example 1, there were placed hexane, triethylaluminum and the solid, which were then heated to 90°C. Then, hydrogen was introduced in a total pressure of 5.6 kg/cm²G, followed by supply of ethylenepropylene mixed gas containing 2 mol. % propylene. The polymerization was made for 1 hour while maintaining pressure of the autoclave at 10 kg/cm²G. There was obtained 295 g. of white polymer with a melt index of 5.9, a bulk specific gravity of 0.26 and an average particle size of 430μ. Activity of the catalyst was 54,500 g. polymer/g. Ti.hr..$C_2H_4$ pressure 2,230 g. polymer/g. solid.hr..$C_2H_4$ pressure. Izod impact strength of the resulting polymer was 0.88 ft. lb./in.

We claim:

1. Process for the polymerization of ethylene in the presence of solvent to provide solid particles of polyethylene present in said solvent, said polymerization being carried out in the presence of a catalyst consisting essentially of a solid component containing a titanium compound and/or a vanadium compound and an organometallic compound selected from the group consisting of organoaluminum compounds and organozinc compounds, said solid component being obtained by copulverizing (1) a metal halide selected from the group consisting of magnesium chloride, magnesium bromide, magnesium iodide and manganese chloride, (2) an organoboron compound selected from the group consisting of $B(OCH_3)_3$, $B(OC_2H_5)_3$, $B(On—C_3H_7)_3$, $B(Oi—C_3H_7)_3$, $B(On—C_4H_9)_3$, $B(Ot—C_4H_9)_3$, $B(OC_6H_5)_3$, $B(OCH_3)_2Cl$, $B(OC_2H_5)_2Cl$, $B(Oi—C_3H_7)_2Cl$ and $B(Ot—C_4H_9)_2Cl$, the ratio of the metal halide to the organoboron compound being in the range from 1:0.5 to 1:0.1, and (3) a titanium compound and/or a vanadium compound, the copulverization of the metal halide, organoboron compound and titanium compound and/or vanadium compound being carried out at a temperature between 0° C. and 200°C. for a period from 0.5 to 50 hours in an inert gas atmosphere, and the titanium and/or vanadium content in the resulting solid being in the range of from 0.5 to 20 percent by weight.

2. Process according to claim 1 wherein the organometallic compound is used in a proportion from 1.0 to 1,000 moles per mole of the titanium compound and/or the vanadium compound.

3. Process according to claim 1 wherein the polymerization is carried out in the presence of hydrogen.

* * * * *

UNITED STATES PATENT AND TRADEMARK OFFICE
CERTIFICATE OF CORRECTION

PATENT NO. : 4,209,601
DATED : June 24, 1980
INVENTOR(S) : Kuroda, et al.

It is certified that error appears in the above-identified patent and that said Letters Patent are hereby corrected as shown below:

In Abstract, "$B(OR)_n X_{3-n} X_3$" should read as -- $B(OR)_n X_{3-n}$ --

Column 4, line 20, "preferably" should read as -- preferable --

Column 4, line 47, "unter" should read as -- under --

In The Claims, Column 8, line 28, "1:0.1" should read as -- 1:0.01 --

Column 8, line 38, "1.0" should read as -- 0.1 --.

Signed and Sealed this

Twenty-eighth Day of October 1980

[SEAL]

Attest:

SIDNEY A. DIAMOND

Attesting Officer

Commissioner of Patents and Trademark